Patented Oct. 7, 1924.

1,510,891

UNITED STATES PATENT OFFICE.

IRWIN S. JOSEPH, OF RAHWAY, NEW JERSEY.

PROCESS OF MAKING CYANIDES.

No Drawing. Application filed April 23, 1923. Serial No. 634,179.

*To all whom it may concern:*

Be it known that I, IRWIN S. JOSEPH, a citizen of the United States, residing at Rahway, in the county of Union and State of New Jersey, have invented certain new and useful Improvements in Processes of Making Cyanides, of which the following is a specification.

The object of this invention is the provision of a novel process by which cyanides of the alkali metals, and more especially sodium cyanide, may be economically prepared in any desired purity of concentration from commercial lime-nitrogen. According to my process calcium cyanamid, preferably in the form of commercial lime-nitrogen, is first caused to react with a salt of an alkali metal under conditions to yield an insoluble compound of calcium and the alkali-metal cyanamid. These being separated, the latter is then transformed into the corresponding cyanide, for example by the methods at present used for the conversion of cyanamids obtained from other sources.

My invention is not limited to any specific reacting conditions, but the following example gives the best conditions now known to me for carrying the invention into effect.

Calcium cyanamid, as commercial lime-nitrogen, is suspended in finely subdivided condition in water to which is added, either before or after the introduction of the cyanamid, the required equivalent of sodium salt to effect the conversion of the calcium cyanamid to the corresponding sodium salt, with coincident precipitation of the calcium. For this purpose the sodium salt chosen should be one, as the carbonate or sulfate, which is capable of precipitating calcium. The temperatures should be kept low, preferably at 10° C. or under, in order to prevent decomposition of the cyanamid. Preferably also strongly alkaline conditions should be avoided, and this makes it desirable, more especially when sodium carbonate is used as the converting salt, to effect the double decomposition by the alternating addition to a body of water, with thorough stirring, of successive small portions of the respective reagents, lime-nitrogen and sodium carbonate. Since commercial lime-nitrogen may contain considerable free lime which would tend to causticize the carbonate and give undesirably alkaline conditions, it is desirable to add sufficient bicarbonate of sodium to prevent the presence of substantial amounts of free hydroxid in the solution. When sodium sulfate is used as the conversion agent, a closer approximation to neutrality may be maintained; and any desired approximation to neutrality, or even an acid reaction, may be secured by using appropriate mixtures of neutral and acid sulfates of sodium. My invention is not restricted however to these specific conditions, or any of them.

The alternating addition of the lime-nitrogen and the sodium salt is continued until the concentration of the sodium cyanamid is as high as practicable, whereupon the solution of sodium cyanamid is separated, by filtration or equivalent methods, from the precipitated calcium salt. The solution is then evaporated to dryness under vacuum, and at low temperature. The sodium cyanamid thus prepared is fused and is transformed by interaction with carbonaceous material, such as charcoal, into sodium cyanide. This operation may be carried out in the known manner.

Although I have referred specifically to the production of sodium cyanide, it is understood that the invention is equally applicable to the preparation of other alkali metal cyanides, as potassium cyanide, by using the corresponding salts in equivalent proportions.

I claim:

1. In a process of preparing alkali metal cyanides from commercial lime-nitrogen the step which consists in causing lime-nitrogen and a sodium salt capable of precipitating calcium to react in the presence of water and avoiding excessive alkalinity in the reaction mixture by adding the lime-nitrogen and the sodium salt to the water in successive small quantities.

2. The step in the process of preparing alkali metal cyanides from commercial lime-nitrogen as defined in claim 1 in which decomposition of cyanamid is avoided by maintaining the temperature of the reaction mixture at about 10° C. or under and in which the addition of lime-nitrogen and sodium salt is continued with thorough stirring of the reaction mixture until the desired concentration of alkali metal cyanamid in the reaction mixture is reached.

3. In a process of making alkali metal cyanides from commercial lime-nitrogen the steps which consist in causing lime-nitrogen and an alkali metal salt capable of precipitating calcium to react in an aqueous medium and preventing the development of excessive alkalinity in the reaction mixture by the addition thereto of a neutralizing agent.

4. In the step of preventing the development of excessive alkalinity in the reaction mixture by the addition thereto of a neutralizing agent as defined in claim 3, the use of an acid salt of the alkali metal capable of precipitating lime as the neutralizing agent.

5. In a process of preparing alkali metal cyanides from commercial lime-nitrogen the step which consists in causing lime-nitrogen and an alkali metal carbonate to react in an aqueous medium.

6. In a process of preparing alkali metal cyanides from commercial lime-nitrogen the steps which consist in causing lime-nitrogen and an alkali metal carbonate to react in an aqueous medium and adding an alkali metal bicarbonate to the reaction mixture.

7. In a process of preparing alkali metal cyanides from commercial lime-nitrogen the step which consists in supplying successive small additions of an alkali metal carbonate and lime-nitrogen with an alkali metal bicarbonate to water with thorough stirring while maintaining the reaction mixture at a temperature of about 10° C. or under.

In testimony whereof, I affix my signature.

IRWIN S. JOSEPH.